Jan. 20, 1942. L. GOLDHAMMER 2,270,287
ROLL FILM CAMERA
Filed Aug. 30, 1939 2 Sheets-Sheet 1
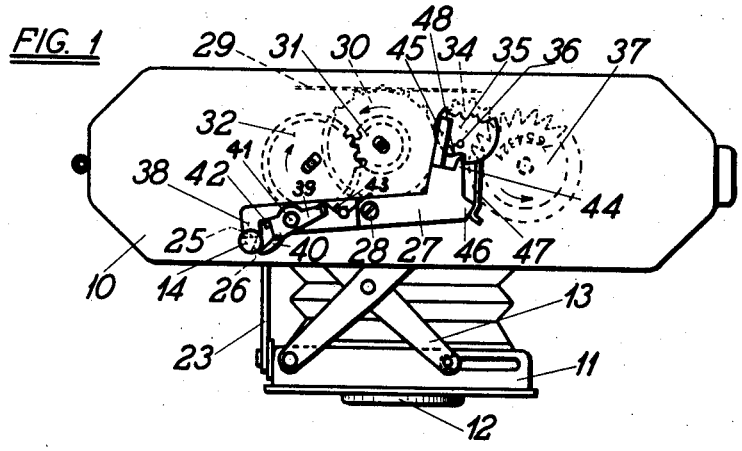
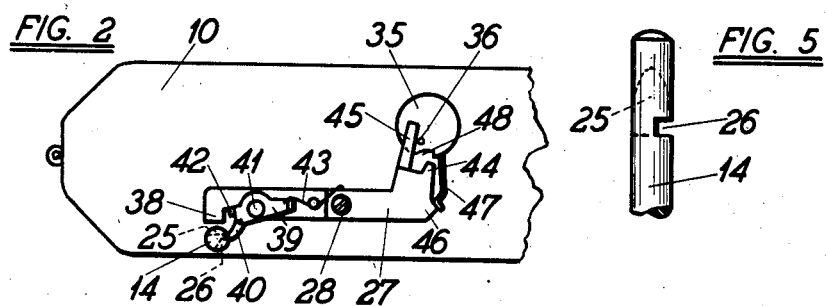
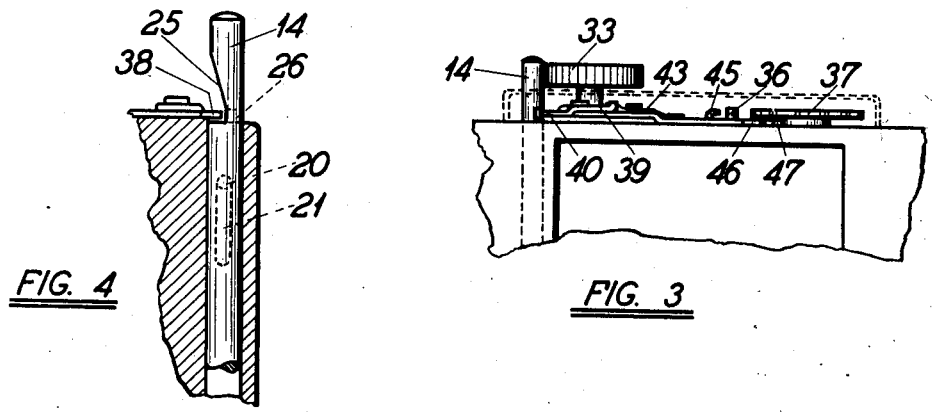
LEO GOLDHAMMER
INVENTOR
BY Philip S. Hopkins
William C. Babcock
ATTORNEYS Jan. 20, 1942.     L. GOLDHAMMER     2,270,287
ROLL FILM CAMERA
Filed Aug. 30, 1939     2 Sheets-Sheet 2
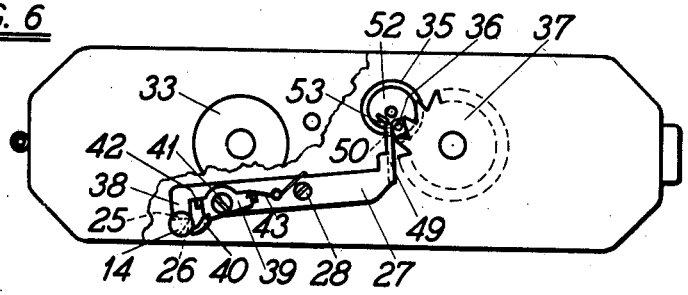
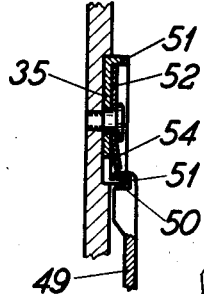
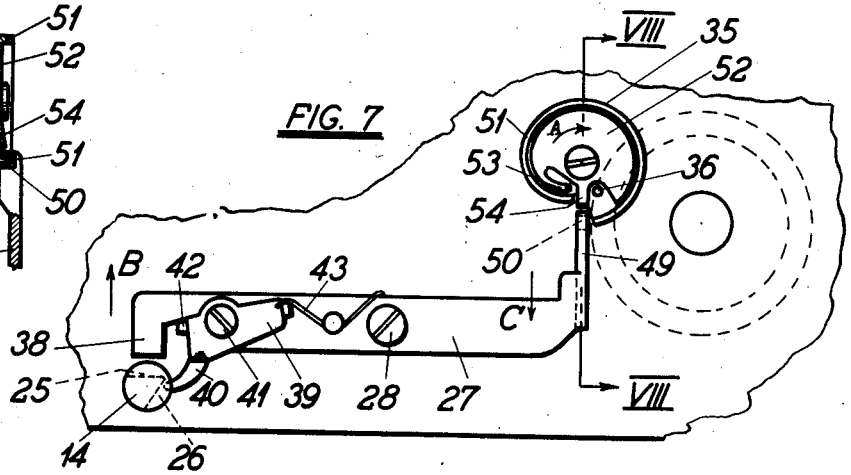
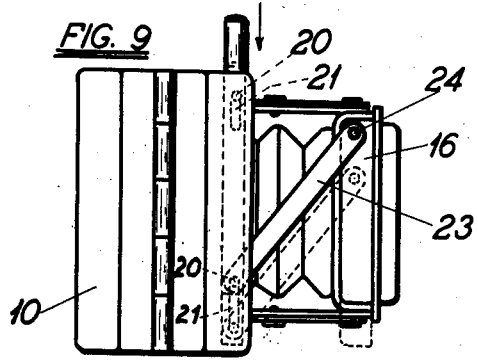
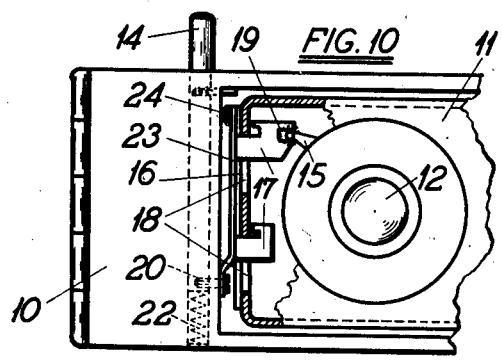
LEO GOLDHAMMER
INVENTOR
BY
ATTORNEYS Patented Jan. 20, 1942

2,270,287

UNITED STATES PATENT OFFICE 2,270,287

ROLL FILM CAMERA

Leo Goldhammer, Munich, Germany, assignor, by mesne assignments, to General Aniline & Film Corporation, New York, N. Y., a corporation of Delaware Application August 30, 1939, Serial No. 292,648
In Germany November 6, 1936

4 Claims. (Cl. 95—32)

My present invention relates to a roll film camera and more particularly to an improved device for alternately locking the shutter release and the film feeding mechanism. This application is a continuation in part of my previous applications Serial No. 172,589, filed Nov. 3, 1937, and Serial No. 215,200, filed June 22, 1938.

It is an object of this invention to provide a locking device for the shutter release and film feeding mechanism in which operation of the shutter release must be followed by winding into position a fresh portion of film before the shutter can again be operated, and in which further winding of said film is prevented until said shutter release has been operated.

Another object is to provide such a locking device in the form of a locking lever movable between two positions, in one of which the lever is adapted to lock the shutter release, and in the other of which it will lock the film feeding mechanism.

A further object is the provision of such a device in the form of a two-armed lever, one arm of which carries the locking means for the shutter and the other arm of which carries the film feed lock.

Still another object is the provision of an improved locking device for the shutter release in which operation of the release pin moves the locking device into functioning position.

An additional object is the provision of locking means controlled by a wheel supplied with a spiral ruff and driven by the film feeding mechanism.

Another object is the provision of such a control wheel on which means are fixed to prevent a turning back of the film or an unintentional movement of the locking member when the camera is accidentally shaken.

Further objects and advantages will appear from the following specification.

In the accompanying drawings forming a part of this application, Fig. 1 shows a plan view (partially broken away for clearness) of a roll film camera embodying one form of locking means according to my invention, the film feeding mechanism being locked.

Fig. 2 is a detail view of the locking lever with the shutter release locked.

Fig. 3 is a side elevation of the locking device.

Figs. 4 and 5 are detailed views of the release pin on an enlarged scale.

Fig. 6 is a view similar to Fig. 1 (with the camera front removed for clearness) of another form of locking device according to the invention, with the film feeding mechanism locked.

Fig. 7 is an enlarged view of the device of Fig. 6, the shutter release being locked.

Fig. 8 is a sectional view on the line VIII—VIII of Fig. 7, and Figs. 9 and 10 are side and front views, respectively, showing the operative connection between the body shutter release and the shutter lever on the extensible camera front.

In order that those skilled in the art may fully understand the nature and scope of my invention, the following detailed and concise description thereof is given, with particular reference to the drawings, wherein like reference characters indicate like parts.

The camera body 10 is provided with the customary extensible front or lens board 11, on which is mounted the objective lens 12. The extension and retraction of the front 11 may be provided for in known manner, as, for example, by the lazy tongs linkage 13 (Fig. 1).

On the body 10 is positioned a movable shutter release pin 14, the details of which are to be described below. This release pin 14 may be connected in any customary way to the operating lever 15 of a shutter (not shown) mounted on the extensible front (see Figs. 1, 9 and 10). The construction shown in the drawings is that form which is described and claimed in my co-pending application Serial No. 168,185, filed October 9, 1937. In this form of connecting device, the camera front 11 is provided with a slidable member 16 adapted to slide in a direction substantially parallel to the direction of movement of the release pin 14. This sliding movement is guided by means of the flanges 17 on the slide 16, which reciprocate within the slots 18 in the camera front 11. One of these flanges 17 is provided with a notch 19 to engage the shutter lever 15 in such a way that downward movement of slide 16 will operate said shutter lever (see Fig. 10).

The release pin 14 is slidably mounted within the camera casing by means of pins 20 and slots 21. A spring 22 tends to hold the release pin in an upward or extended position. Movement of the release pin is transmitted to the slide 16 by means of the tie rod 23 which is pivoted to the upper end of the slide at 24 and to the lower end of the release pin at 20. As pointed out in the above mentioned application, this construction readily transmits the motion of the release pin to the slide and shutter lever, and at the same time permits retraction and extension of the camera front 11.

The release pin 14 is provided according to my invention with an inclined cam surface 25 and a locking notch 26, the functioning of which will be explained in detail below.

The locking mechanism between the release pin and the film feeding mechanism consists essentially of a two-armed lever 27 pivoted to the casing at 28 and having disposed on one arm thereof the locking mechanism for the release pin and on the other arm the locking mechanism for the film feeding device.

The film feeding mechanism is arranged as follows: the perforated film 29 (Fig. 1) is advanced through the camera by means of the sprocket wheel 30, the teeth of which engage the perforations of the film. This sprocket wheel 30 is operatively connected by means of the gears 31 and 32 to the shaft on which the winding knob 33 is mounted. Movement of this knob, therefore, feeds the film in the normal manner.

The film feeding sprocket 30 is also operatively connected to the control wheel 35; for example, by means of a gear 34 attached to the control wheel. The geared connection between the control wheel and sprocket is preferably arranged so that the control wheel makes exactly one complete revolution for each fresh portion of film that is wound into position. The control wheel is provided with a pin 36 which, in addition to a function to be described below, also engages the teeth of a counter 37 to move said counter one unit for each revolution of the control wheel.

One arm of the two-armed lever 27 comprises the hooked lever arm 38 adapted to engage the inclined cam surface 25 of the release pin. This first arm of the lever is further provided with a pawl member 39 having a tooth 40 and pivoted at 41 to this arm of the lever. A stop 42 is arranged to limit the rotary movement of pawl 39 so as to maintain a certain predetermined distance between the tooth 40 and the hooked lever arm 38. This distance is just sufficient to keep the tooth 40 clear of the locking notch when the lever arm 38 is in the position shown in Figs. 1 and 6. A spring 43 tends to rotate the pawl in a clockwise direction in the drawings, thereby urging said tooth 40 to its predetermined position spaced from the lever arm 38.

The operation of this locking mechanism for the release pin 14 is accordingly explained as follows: when a fresh portion of film is in place in the camera the two-armed lever 27 will be in the position shown in Figs. 1, 4 and 6 with the hooked lever arm 38 bearing against the deeper portion of the cam surface 25. As the release pin 14 is operated (downwardly) the cam surface 25 engaging the lever arm 38 will move this arm in the direction of the arrow B of Fig. 7 to the position shown in Figs. 2 and 7. As the pin 14 is depressed the notch 26 will, of course, no longer be opposite the tooth 40, as would normally be the case. Thus, as the lever 38 moves to its new position, the tooth 40 will bear against the pin 14 and will rotate slightly against the spring in a counter-clockwise direction with respect to the lever 27. As soon, however, as the release pin 14 returns to its normal position (by reason of the action of spring 22) the locking notch 26 will again be opposite the tooth 40 and the pawl 39 will tend to rotate under the action of spring 43, so that tooth 40 engages notch 26 as shown in Figs. 2 and 7. Thus a second operation of the release pin 14 will be prevented until the winding of a new portion of film into the exposure chamber causes a return movement of lever 27 to its original position, thereby withdrawing the tooth 40 from locking notch 26.

The operative connection between the film feeding mechanism and the two-armed lever 27 may take various forms, but I have chosen to describe two preferred methods as shown in Figs. 1 through 3, and 6 through 8 respectively.

In the first of these modifications the control wheel 35 provided with the pin 36 previously mentioned is also constructed with a notch 48 in its periphery. The second arm of the two-armed lever 27 is provided with a nose 44 and a finger 45 which engage the notch and pin, as will be explained in a moment. This arm of the lever is also provided with a hump 46 which is engaged by the spring 47 to maintain said arm and lever in whichever of its two positions it occupies at the time. While the film is being wound the nose 44 will bear against the outer rim of the control wheel 35, and as soon as the notch 48 is opposite the nose, the spring 47, cooperating with hump 46, will urge the lever 27 in a counter-clockwise direction so that the nose 44 engages the locking notch 48 and prevents further movement of the film feeding mechanism. During this operation the pin 36 will have moved the counter 37 one unit as previously described. When the release pin 14 is next operated for the taking of the picture, the two-armed lever 27 will be rotated in a clockwise direction by the action of cam surface 25 above described, the nose 44 thereby being withdrawn from notch 48, and the lever held in its new position by spring 47 and hump 46. Since further operation of the release pin is prevented while the lever 27 is in this position, the only possible succeeding operation is the movement of the film feeding mechanism.

As a fresh film is wound into place, the rotation of control wheel 35 causes pin 36 to bear against the finger 45 on lever 27. This action of the pin moves the lever in a counter-clockwise manner, so that locking nose 44 is drawn against the rim of the control wheel 35 and will be urged by spring 47 into locking notch 48 when the feeding operation is complete and the control wheel has made its full revolution. The cycle may then be repeated.

With respect to the second modification, shown in Figs. 6 to 8, the construction and operation are as follows: the film feeding mechanism is moved by a winding knob 33 operatively connected by toothed wheels to the wheels for feeding the film as well as to the control wheel 35 adapted to control the locking member for the releaser 14. The control wheel 35 is provided with a pin 36 engaging the teeth of the counting wheel 37 to move said counter one unit for each revolution of wheel 35. The hooked arm 49 of the two-armed lever 27 adapted to alternately lock the release device and the film feeding device serves as a stop for the pin 36. These two members limit the film feeding. The control wheel 35 is further provided at its periphery with a spiral ruff 51 which engages a notch 50 of the lever arm 49 and moves the lever 27 in turning the control wheel 35, i. e. after the feeding of the film, into the position shown in Fig. 6. The control wheel 35 is further rigidly connected to a spring disc 52 provided with two upturned springs 53 and 54. The disc 52 prevents by means of the spring 53 the turning of the wheel 35 in a counter-clockwise direction because when the film has been advanced, the spring 53 moves upwards and will run against the lever end 49 bent upwards. The spring 54 is pressed against the front of the lever end 49 when the lever 27 after actuating the releaser 14 has been pivoted into the position shown in Fig. 7. The operation of the spring disc 52 is as follows: The springs 53 and 54 are turned upwardly, the spring 53 being somewhat more bent than is the spring 54. By turning the disc 52 in the direction of the arrow A (see Fig. 7) the upturned spring 53 lifts the lever arm 49 which slides, after the film has been advanced, i. e. after a turning of the disc 52 has been finished, onto the less upturned spring 54 so that the lever end 49 is pressed on the one hand against the pin 36 and on the other hand against the spring 54 (see Fig. 6). When the releaser is actuated, the lever end 49 slides down from the spring 54 so that the notch 50 finally lies again in front of the ruff 51. The next operation will be again the feeding of the film.

Assume that a fresh portion of film has been wound into the camera, the rotation of the control wheel being stopped after pin 36 has moved the counter 37 one unit and has come to rest against the lever arm 49. The mechanism will then be in the position shown in Fig. 6. Operation of the release pin 14 will now rotate the lever 27 in the direction of arrows B and C to the position shown in Fig. 7, in which the release pin is locked. The lever 27 is maintained in this position by reason of the upturned spring 54 which extends radially on control wheel 35 against the end of arm 49, as will be clearly seen from Fig. 8. Thus, accidental jarring of the camera cannot cause a return movement of lever 27 in a direction opposite to that of arrows B and C. In this position, the notch 50 of arm 49 is exactly opposite the end of the spiral ruff 51 having the greater radius (see Fig. 8). Since the release pin is locked, the next operation will be the movement of the film feeding mechanism including the control wheel. As the control wheel turns in the direction of arrow A the spiral ruff will engage notch 50 and will gradually draw arm 49 back to the position shown in Fig. 6 by reason of the camming action of the spiral ruff and notch. As arm 49 reaches its original position, pin 36 will again run against this arm and will prevent further movement of the control wheel and feeding mechanism. At the same time, the upturned spring 53 will engage the other side of arm 49 to prevent accidental backward movement of the film feeding mechanism. Thus, in this position the control wheel and film feed are locked and the next operation will be the movement of the release pin and the continuation of the cycle.

Since many embodiments of the inventive concept disclosed herein are possible, and since various constructional equivalents of such embodiments may be made, the invention herein is not to be limited by the foregoing description and illustrations, but only by the appended claims.

I claim:

1. In a rollfilm camera, the combination comprising a slidable shutter release pin having an inclined cam surface and a locking notch, a film feeding device having a control wheel, and a two-armed lever mounted between said release pin and control wheel, one arm of said lever bearing against said cam surface whereby operation of said release pin moves said lever to one position, said first arm having a pawl member pivotally mounted thereon, a spring urging said pawl toward said release pin for engaging said locking notch and preventing a second operation of said release pin only while the two-armed lever is in its first position, said pawl engaging the release pin and being rotated thereby with respect to said lever against the tension of said spring as the lever is moved by the cam surface to its first position, said pawl then snapping into the locking notch when said notch reaches a position opposite the pawl, said control wheel and the other arm of said lever having interengaging means whereby operation of the feeding device moves said lever to a second position retracting said pawl from said notch and permitting a new operation of said release pin, means on said lever for locking said control wheel and film feeding mechanism throughout the time when said lever is in its second position, and means for holding said lever in its first position until said film feeding device is operated.

2. In a rollfilm camera, the combination comprising a slidable shutter release pin having an inclined cam surface and a locking notch, a film feeding device having a control wheel provided with a spiral ruff, a two armed lever mounted between said release pin and said control wheel, one arm of said lever bearing against said cam surface whereby operation of said release pin moves said lever to one position, said first arm having a pawl member pivotally mounted thereon, a spring urging said pawl toward said release pin for engaging said locking notch and preventing a second operation of said release pin only while the two-armed lever is in its first position, said pawl engaging the release pin and being rotated thereby with respect to said lever against the tension of said spring as the lever is moved by the cam surface to its first position, said pawl then snapping into the locking notch when said notch reaches a position opposite the pawl, the other arm of said lever having a notch engaging said spiral ruff whereby rotation of said control wheel moves said lever to a second position withdrawing said pawl member from said notch and permitting a new operation of said shutter release pin, means for locking said control wheel when said lever is in its second position, and means for locking said lever in its first position until said film feeding device is operated.

3. In a rollfilm camera, the combination comprising a slidable shutter release pin having an inclined cam surface and a locking notch, a film feeding device having a control wheel provided with a spiral ruff, a two armed lever mounted between said release pin and said control wheel, one arm of said lever bearing against said cam surface whereby operation of said release pin moves said lever to one position, said first arm having a pawl member pivotally mounted thereon, a spring urging said pawl toward said release pin for engaging said locking notch and preventing a second operation of said release pin only while the two-armed lever is in its first position, said pawl engaging the release pin and being rotated thereby with respect to said lever against the tension of said spring as the lever is moved by the cam surface to its first position, said pawl then snapping into the locking notch when said notch reaches a position opposite the pawl, the other arm of said lever having a notch engaging said spiral ruff whereby rotation of said control wheel moves said lever to a second position withdrawing said pawl member from said locking notch and permitting a new operation of said shutter release pin, and a pin and a locking spring disc mounted on said control wheel, said disc having two springs thereon, one of said springs and said pin engaging said lever in the second position only of said lever whereby said control wheel is locked against movement in either direction, and the other of said springs engaging said lever to hold it in said first position until said control wheel is turned during operation of said film feeding device.

4. In a roolfilm camera, the combination comprising a slidable shutter release pin having an inclined cam surface and a locking notch, a film feeding device having a control wheel provided with a notch and a pin, a two armed lever mounted between said release pin and control wheel, one arm of said lever bearing against said cam surface whereby operation of said release pin moves said lever to one position, said first arm having a pawl member pivotally mounted thereon, a spring urging said pawl toward said release pin for engaging said locking notch and preventing a second operation of said release pin only while the two-armed lever is in its first position, said pawl engaging the release pin and being rotated thereby with respect to said lever against the tension of said spring as the lever is moved by the cam surface to its first position, said pawl then snapping into the locking notch when said notch reaches a position opposite the pawl, the other arm of said lever having a projecting finger engaged by the control wheel pin for movement of said lever toward a second position when said film feeding mechanism is operated, said second arm having a locking nose for engaging said control wheel notch and locking said film feeding mechanism when said lever is in said second position, and spring means for holding said lever alternately in its two positions.

LEO GOLDHAMMER.